(12) United States Patent
Lasch et al.

(10) Patent No.: US 11,789,951 B2
(45) Date of Patent: Oct. 17, 2023

(54) STORAGE OF DATA STRUCTURES

(71) Applicant: SAP SE, Walldorf (DE)

(72) Inventors: Robert Lasch, Walldorf (DE); Thomas Legler, Walldorf (DE); Robert Schulze, Walldorf (DE); Kai-Uwe Sattler, Ilmenau (DE)

(73) Assignee: SAP SE, Walldorf (DE)

( * ) Notice: Subject to any disclaimer, the term of this patent is extended or adjusted under 35 U.S.C. 154(b) by 58 days.

(21) Appl. No.: 17/468,427

(22) Filed: Sep. 7, 2021

(65) Prior Publication Data
US 2022/0405288 A1 Dec. 22, 2022

Related U.S. Application Data

(60) Provisional application No. 63/211,812, filed on Jun. 17, 2021.

(51) Int. Cl.
*G06F 16/245* (2019.01)
*G06F 11/34* (2006.01)
*G06F 16/2455* (2019.01)

(52) U.S. Cl.
CPC .... *G06F 16/24569* (2019.01); *G06F 11/3428* (2013.01); *G06F 16/24552* (2019.01)

(58) Field of Classification Search
CPC ......... G06F 16/24552–24569; G06F 12/00–16
See application file for complete search history.

(56) References Cited

U.S. PATENT DOCUMENTS

| | | | | |
|---|---|---|---|---|
| 2016/0054934 A1* | 2/2016 | Hahn | .................... | G06F 3/0679 711/103 |
| 2020/0110537 A1* | 4/2020 | Hahn | ...................... | G06F 3/061 |

OTHER PUBLICATIONS

Shepard, "Memory basics—Volatile, non-volatile and persistent" found on Jan. 25, 2023 from http://microcontrollertips.com/memory-basics-volatile-non-volatile-persistent-faq/, Aug. 6, 2020. (Year: 2020).*

Mihnea Andrei, Christian Lemke, Günter Radestock, Robert Schulze, Carsten Thiel, Rolando Blanco, Akanksha Meghlan, Muhammad Sharique, Sebastian Seifert, Surendra Vishnoi, Daniel Booss, Thomas Peh, Ivan Schreter, Werner Thesing, Mehul Wagle, and Thomas Willhalm. 2017. SAP HANA Adoption of Non-Volatile Memory. Proc. VLDB Endow. 10, 12 (Aug. 2017), 1754-1765.

(Continued)

*Primary Examiner* — Robert W Beausoliel, Jr.
*Assistant Examiner* — Nirav K Khakhar
(74) *Attorney, Agent, or Firm* — Mintz Levin Cohn Ferris Glovsky and Popeo, P.C.

(57) ABSTRACT

A method, a system, and a computer program product for placement or storage of data structures in memory/storage locations. A type of a data structure for storing data and a type of data access to the data structure are determined. The type of data access includes a first and a second type of data access. A frequency of each type of access to each type of data structure accessed by a query is determined. Using the determined frequency, a number of first type of data accesses to the data structure is compared to a number of second type of accesses to the data structure. The numbers of first and second types of data access are compared to a predetermined threshold percentage of a total number of data accesses to the data structure. Based on the comparisons, a physical memory location for storing data is determined.

20 Claims, 12 Drawing Sheets

(56) References Cited

OTHER PUBLICATIONS

Joy Arulraj, Justin Levandoski, Umar Farooq Minhas, and Per-Ake Larson. 2018. BzTree: A High-Performance Latch-Free Range Index for Non-Volatile Memory. Proc. VLDB Endow. 11, 5 (Jan. 2018), 553-565.

Joy Arulraj and Andrew Pavlo. 2017. How to Build a Non-Volatile Memory Database System. In Proceedings of the 2017 ACM International Conference on Management of Data (Chicago, Illinois, USA) (SIGMOD '17). Association for Computing Machinery, New York, NY, USA, 1753-1758.

Joy Arulraj, Andy Pavlo, and Krishna Teja Malladi. 2019. Multi-Tier Buffer Management and Storage System Design for Non-Volatile Memory. CoRR abs/1901.10938 (2019). arXiv:1901.10938 http://arxiv.org/abs/1901.10938.

Bishwaranjan Bhattacharjee, Mustafa Canim, Christian A Lang, George A Mihaila, and Kenneth A Ross. 2010. Storage Class Memory Aware Data Management. IEEE Data Eng. Bull. 33, 4 (2010), 35-40.

Martin Boissier, Rainer Schlosser, and Matthias Uflacker. 2018. Hybrid Data Layouts for Tiered HTAP Databases with Pareto-Optimal Data Placements. In 2018 IEEE 34th International Conference on Data Engineering (ICDE). IEEE, Piscataway Township, NJ, USA, 209-220.

Michael Brendle, Nick Weber, Mahammad Valiyev, Norman May, Robert Schulze, Alexander Böhm, Guido Moerkotte, and Michael Grossniklaus. 2021. Precise, Compact, and Fast Data Access Counters for Automated Physical Database Design. BTW 2021 (2021).

Shimin Chen and Qin Jin. 2015. Persistent B+-Trees in Non-Volatile Main Memory. Proc. VLDB Endow. 8, 7 (Feb. 2015), 786-797.

Justin DeBrabant, Joy Arulraj, Andrew Pavlo, Michael Stonebraker, Stan Zdonik, and Subramanya Dulloor. 2014. A prolegomenon on OLTP database systems for non-volatile memory. ADMS@VLDB (2014).

Franz Färber, Norman May,Wolfgang Lehner, Philipp Große, Ingo Müller, Hannes Rauhe, and Jonathan Dees. 2012. The SAP HANA Database—An Architecture Overview. IEEE Data Eng. Bull. 35, 1 (2012), 28-33.

Joseph Izraelevitz, Jian Yang, Lu Zhang, Juno Kim, Xiao Liu, Amirsaman Memaripour, Yun Joon Soh, Zixuan Wang, Yi Xu, Subramanya R. Dulloor, Jishen Zhao, and Steven Swanson. 2019. Basic Performance Measurements of the Intel Optane DC Persistent Memory Module. CoRR abs/1903.05714 (2019). arXiv:1903.05714 http://arxiv.org/abs/1903.05714.

Christian Lemke, Kai-Uwe Sattler, Franz Faerber, and Alexander Zeier. 2010. Speeding Up Queries in Column Stores. In Data Warehousing and Knowledge Discovery. Springer Berlin Heidelberg, Berlin, Heidelberg, 117-129.

Lucas Lersch, Wolfgang Lehner, and Ismail Oukid. 2019. Persistent Buffer Management with Optimistic Consistency. In Proceedings of the 15th International Workshop on Data Management on New Hardware (Amsterdam, Netherlands) (DaMoN'19). Association for Computing Machinery, New York, NY, USA, Article 14, 3 pages.

Ingo Müller, Cornelius Ratsch, Franz Faerber, et al. 2014. Adaptive String Dictionary Compression in In-Memory Column-Store Database Systems . . . In EDBT, vol. 14. 283-294.

Ismail Oukid, Daniel Booss, Wolfgang Lehner, Peter Bumbulis, and Thomas Willhalm. 2014. SOFORT: A Hybrid SCM-DRAM Storage Engine for Fast Data Recovery. In Proceedings of the Tenth InternationalWorkshop on Data Management on New Hardware (Snowbird, Utah) (DaMoN '14). Association for Computing Machinery, New York, NY, USA, Article 8, 7 pages.

Ismail Oukid, Johan Lasperas, Anisoara Nica, Thomas Willhalm, and Wolfgang Lehner. 2016. FPTree: A Hybrid SCM-DRAM Persistent and Concurrent B-Tree for Storage Class Memory (SIGMOD '16). Association for Computing Machinery, New York, NY, USA, 371-386.

Andrew Pavlo, Gustavo Angulo, Joy Arulraj, Haibin Lin, Jiexi Lin, Lin Ma, Prashanth Menon, Todd C Mowry, Matthew Perron, Ian Quah, et al. 2017. Self-Driving Database Management Systems . . . In CIDR, vol. 4. 1.

Reza Sherkat, Colin Florendo, Mihnea Andrei, Rolando Blanco, Adrian Dragusanu, Amit Pathak, Pushkar Khadilkar, Neeraj Kulkarni, Christian Lemke, Sebastian Seifert, Sarika Iyer, Sasikanth Gottapu, Robert Schulze, Chaitanya Gottipati, Nirvik Basak, Yanhong Wang, Vivek Kandiyanallur, Santosh Pendap, Dheren Gala, Rajesh Almeida, and Prasanta Ghosh. 2019. Native Store Extension for SAP HANA. Proc. VLDB Endow. 12, 12 (Aug. 2019), 2047-2058.

Alexander van Renen, Viktor Leis, Alfons Kemper, Thomas Neumann, Takushi Hashida, Kazuichi Oe, Yoshiyasu Doi, Lilian Harada, and Mitsuru Sato. 2018. Managing Non-Volatile Memory in Database Systems. In Proceedings of the 2018 International Conference on Management of Data (Houston, TX, USA) (SIGMOD '18). Association for Computing Machinery, New York, NY, USA, 1541-1555.

Lukas Vogel, Viktor Leis, Alexander van Renen, Thomas Neumann, Satoshi Imamura, and Alfons Kemper. 2020. Mosaic: A Budget-Conscious Storage Engine for Relational Database Systems. Proc. VLDB Endow. 13, 12 (Jul. 2020), 2662-2675. DAMON'21, Jun. 20-25, 2021, Virtual Event, China Robert Lasch, Robert Schulze, Thomas Legler, and Kai-Uwe Sattler.

Thomas Willhalm, Nicolae Popovici, Yazan Boshmaf, Hasso Plattner, Alexander Zeier, and Jan Schaffner. 2009. SIMD-Scan: Ultra Fast in-Memory Table Scan Using on-Chip Vector Processing Units. Proc. VLDB Endow. 2, 1 (Aug. 2009), 385-394.

Krishna Yalamanchi. 2021. Turbocharge your S/4HANA experience with Optane Persistent Memory. https://community.intel.com/t5/Intel-Optane-Persistent-Memory/Turbocharge-your-S-4HANA-experience-with-Optane-Persistent/ba-p/1263628 Last accessed: Mar. 25, 2021.

* cited by examiner

STORAGE OF DATA STRUCTURES

CROSS-REFERENCE TO RELATED APPLICATIONS

The present application claims priority to U.S. Provisional Patent Appl. No. 63/211,812 to Lasch et al., filed Jun. 17, 2021, and entitled "Storage of Data Structures," and incorporates its disclosure herein by reference in its entirety.

TECHNICAL FIELD

This disclosure relates generally to data processing and, in particular, to storing of data structures in various memory locations.

BACKGROUND

Data may be stored in volatile and non-volatile memory. Volatile memory requires power to maintain stored information. Its examples include various random-access memory, such as, dynamic random access memory (DRAM). Non-volatile memory (NVM) does not require power to maintain stored information. Non-volatile memory may be a persistent memory, which may include, for example, Intel 3D XPoint memory technology among others. NVM offers lower costs per capacity and higher total capacities than DRAM. However, NVM cannot be used as a drop-in replacement for DRAM in database management systems due to its different performance characteristics. Non-volatile memory (NVM) represents an emerging technology which offers exciting opportunities for the design and optimization of data structures and data placement/storage strategies. NVM, as compared to solid-state disks, offers low latency and byte-addressability, while providing high capacities and persistence in comparison to volatile DRAM.

SUMMARY

In some implementations, the current subject matter relates to a computer implemented method for placement or storage of data structures in memory/storage locations. The method may include determining a type of a data structure for storing data and a type of data access to the data structure. The type of data access may include at least a first type of data access and a second type of data access. The method may further include determining a frequency of each type of access to each type of data structure accessed by a query. Using the determined frequency, a number of first type of data accesses may be compared to the data structure to a number of second type of accesses to the data structure. Further, the number of first type of data access and the number of the second type of data access may be compared to a predetermined threshold percentage of a total number of data accesses to the data structure. The method may also include determining, based on the comparing, a physical memory location for storing data.

In some implementations, the current subject matter may include one or more of the following optional features. The data structure may include at least one of the following: a data vector, a dictionary, and any combination thereof. The type of data access may include at least one of the following: a point access, a data scan, a dense point access, and any combinations thereof.

In some implementations, the frequencies of accesses for the data structure may be determined using one or more counters. One or more counters may be configured to determine at least one of the following: a total number of access to the data structure, a number of point accesses to the data structure, a number of data scans of the data structure, a number of dense point accesses to the data structure, and any combination thereof.

In some implementations, the first type of access may include at least one of the following: a scan access of the data structure, a dense point access of the data structure, and any combination thereof. The second type of access to the data structure may include a point access to the data structure.

In some implementations, the physical memory location may include at least one of the following: a non-volatile memory, a random access memory, and any combination thereof.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address the deficiencies of currently available solutions, one or more implementations of the current subject matter provide for an ability to determine placement/storage of data structures, e.g., column-store data, in various memory types, e.g., non-volatile memory (NVM), random access memory (such as, dynamic random access memory (DRAM)).

In some implementations, the current subject matter may be configured to determine a type of memory for placement or storing of a particular data structure, object, etc. (referred herein as "data structure"). The determination may be made based on at least one of the following: a type of data structure (e.g., a data vector data structure, a dictionary data structure, etc.), a type of access to the data structure (e.g., scan access, a point access, a dense point access, etc.), a frequency of access to a particular data structure (e.g., a total number of accesses to a data structure), and/or any other factors and/or any combinations thereof.

In some implementations, to determine a frequency of access to a particular data structure, the current subject matter may, for example, be configured to implement a counter that may be assigned to and/or associated with each data structure. The counter may be in a form of software, hardware, and/or both. It may count the number of times a data structure, along with its type, has been accessed and the type of access required. Based on the information obtained from the counter, the current subject matter may be configured to retain the data structure in one type of memory location (e.g., dynamic random access memory) or move the data structure to (and store in) another type of memory location (e.g., non-volatile memory). In some exemplary, non-limiting implementations, the current subject matter system may be configured to move/transfer as much data (e.g., contained in data structures) to NVM as possible without negatively affecting access times, query performance, etc.

Figure 1:
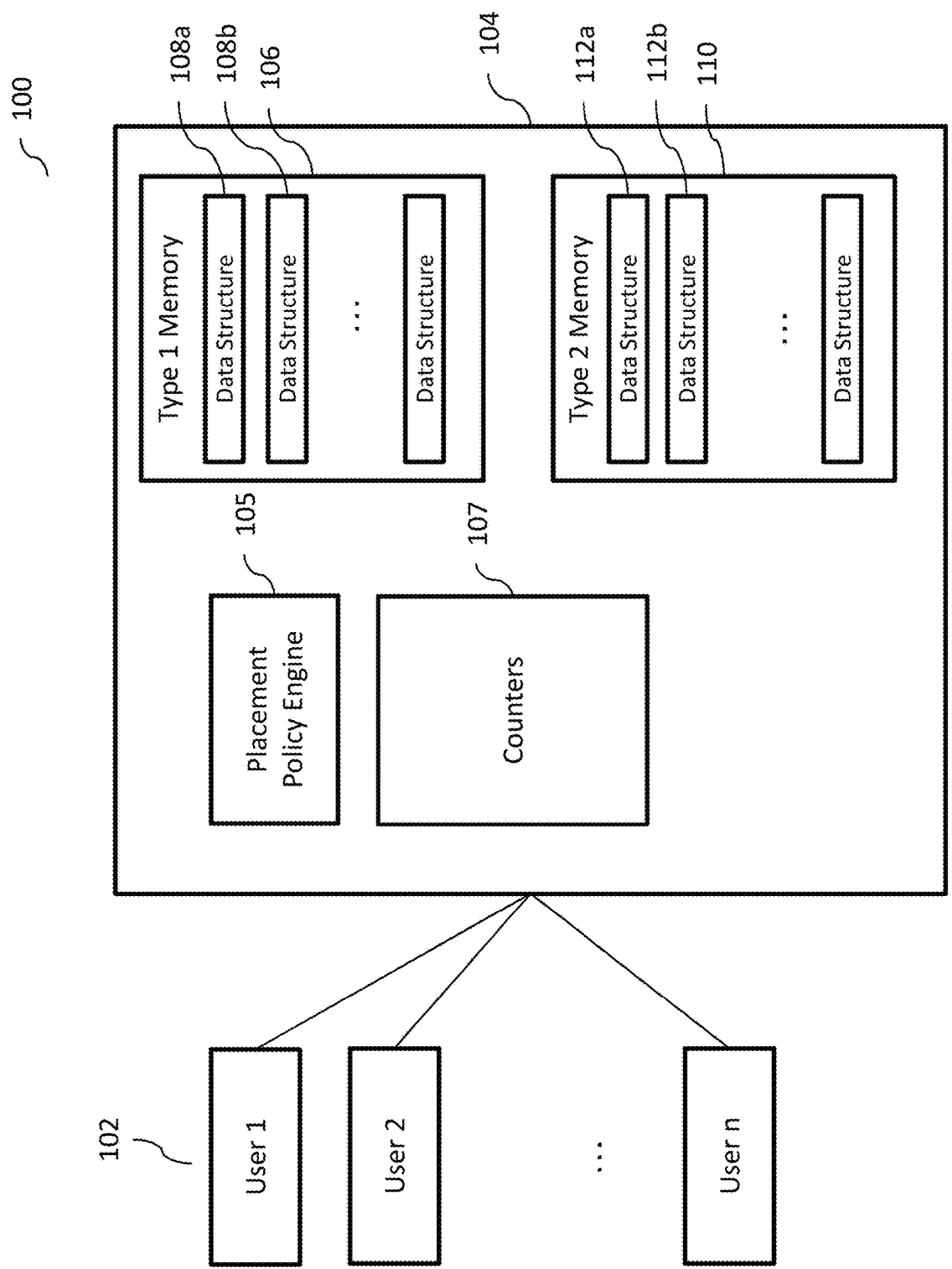
FIG. 1 illustrates an exemplary system for determining placement/memory location of specific data structures, according to some implementations of the current subject matter.

FIG. 1 illustrates an exemplary system 100 for determining placement/storage location of specific data structures, according to some implementations of the current subject matter. The system 100 may include one or more user devices 102 (e.g., user 1, user 2, etc.), and a data placement/storage management system 104, which may include a placement policy engine and/or computing platform 105, one or more counters 107, and one or more memory components (e.g., in-memory representation) 106, 110. The memory component 106 may be a type 1 memory component (e.g., an NVM memory) and memory component 110 may be a type 2 memory component (e.g., a random access memory, such as, DRAM, etc.). Each memory component 106, 110 may be configured to store one or more respective data structures, e.g., memory component 106 may be configured to store data structures 108 (a, b, . . . ), and memory component 110 may be configured to store data structures 112 (a, b, . . . ). Components 102-104 may be communicatively coupled using one or more communications networks. The communications networks can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

The components 102-104 may include any combination of hardware and/or software. In some implementations, components 102-104 may be disposed on one or more computing devices, such as, server(s), database(s), personal computer(s), laptop(s), cellular telephone(s), smartphone(s), tablet computer(s), and/or any other computing devices and/or any combination thereof. In some implementations, the components 102-104 may be disposed on a single computing device and/or can be part of a single communications network. Alternatively, the components may be separately located from one another.

A user device 102, may access the system 100 to obtain access to one or more data structures. For example, the user device may be configured to execute a query (e.g., a data scan, a point access, a dense access, as discussed herein). The user device 102 may be used to generate a query and transmit it to the system 104, which may determine which database may contain requisite information and then connect with that database to execute a query and retrieve appropriate information. One or more users using devices 102 may access the system 100. The user devices may be individual user devices, computing devices, software applications, objects, functions, and/or any other types of users and/or any combination thereof.

The engine 105 may be configured to make a determination as to whether or not specific data structures stored in one data storage (e.g., memory component 106) may need to be transferred to another data storage (e.g., memory component 110). As stated above, the engine 105 may make such determination based on various factors, such as, frequency of access to a particular data structure (e.g., data structures 108, 110), which may include a total number of accesses to a data structure, a type of data structure (e.g., a data vector data structure, a dictionary data structure, etc.), a type of access to the data structure (e.g., scan access, a point access, a dense point access, etc.), and/or any other factors and/or any combinations thereof. The frequency of access to a particular data structure may be determined by one or more counters 107. Each data structure may be configured to be assigned and/or associated with a counter 107. The counter 107 may be configured to provide a value indicative of a number of times that a specific data structure was accessed by the engine 105.

The memory components 106, 110 may be configured to store data in various formats, e.g., table format, column-row format, key-value format, etc. (e.g., each key may be indicative of various attributes and each corresponding value may be indicative of attribute's value). As can be understood, the data may be stored in any desired format.

The following provides a discussion of a data placement/storage determination process that may be performed by the engine 105. The engine 105 may be configured to perform these determinations automatically, periodically, and/or as-needed/desired basis.

In some example, non-limiting implementations, the system 100 may be configured to determine placement/memory locations (e.g., NVM, DRAM, etc.) for read-optimized column store data structures, with the goal of finding a placement policy that places as much data on "cheaper" memory (e.g., NVM) as possible without compromising query performance. For illustrative purposes only, the following discussion will refer to NVM (e.g., memory component 106 as shown in FIG. 1) as one type of memory and DRAM (e.g., memory component 110 as shown in FIG. 1) as another type of memory. As can be understood, any other types of memory may be used.

The system 100 may be configured to enable placement of data in NVM. Moreover, the system 100 may be identify one or more dominant access types using access counters (e.g., counters 107) on the two data structures in the system 100, e.g., data vectors and dictionaries (e.g., two data structures in SAP HANA, as available from SAP SE, Walldorf, Germany). The system 100 may then generate a determination for placement of the data structures (e.g., individual columns, etc.) based on the access counters.

Figure 2:
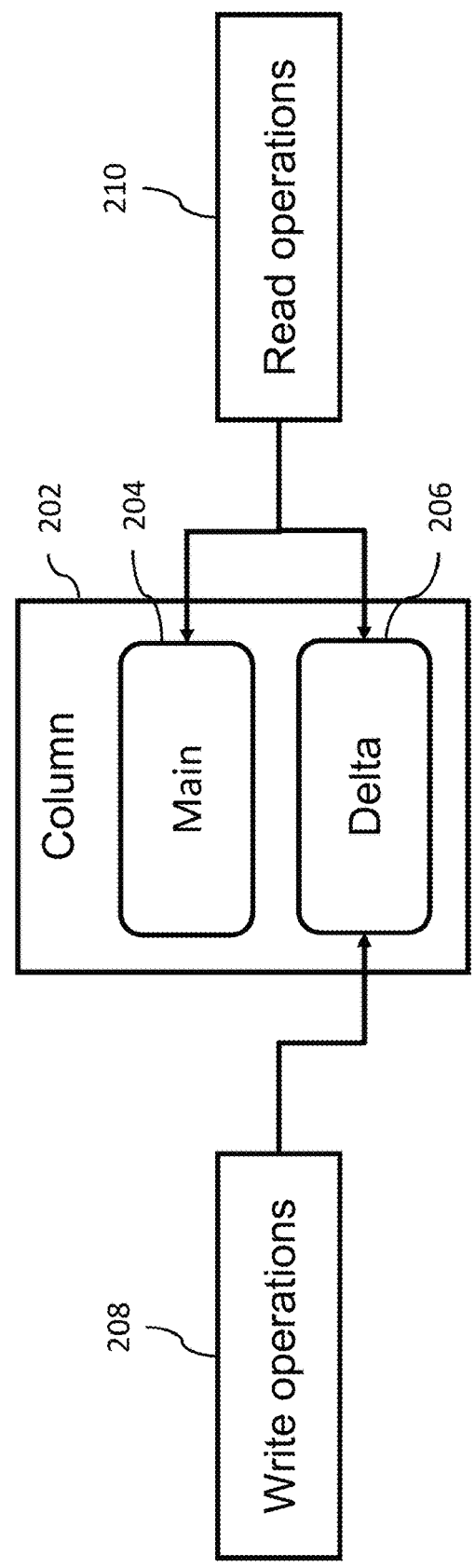
FIG. 2 illustrates an exemplary data store structure, e.g., a column store (e.g., its main part), that may be used for determination of placement by the system shown in FIG. 1.

FIG. 2 illustrates an exemplary data store structure, e.g., a column store, 200 that may be used for determination of placement by the system 100. The structure 200 may include a column 202 that may include a main data fragment 204 and a delta fragment 206 (e.g., representing changes to the main data fragment 204). Write operations 208 may be performed on the delta component 206 and read operations 210 may access main and delta fragments 204, 206 of the column 202. The main and delta fragments may be merged on-demand. The main fragments may be read-optimized and may be immutable. The system 100 may be configured to determine placement of the main fragments, as they typically are read-only and hold the majority of data (e.g., more than 90% of data).

Figure 3:
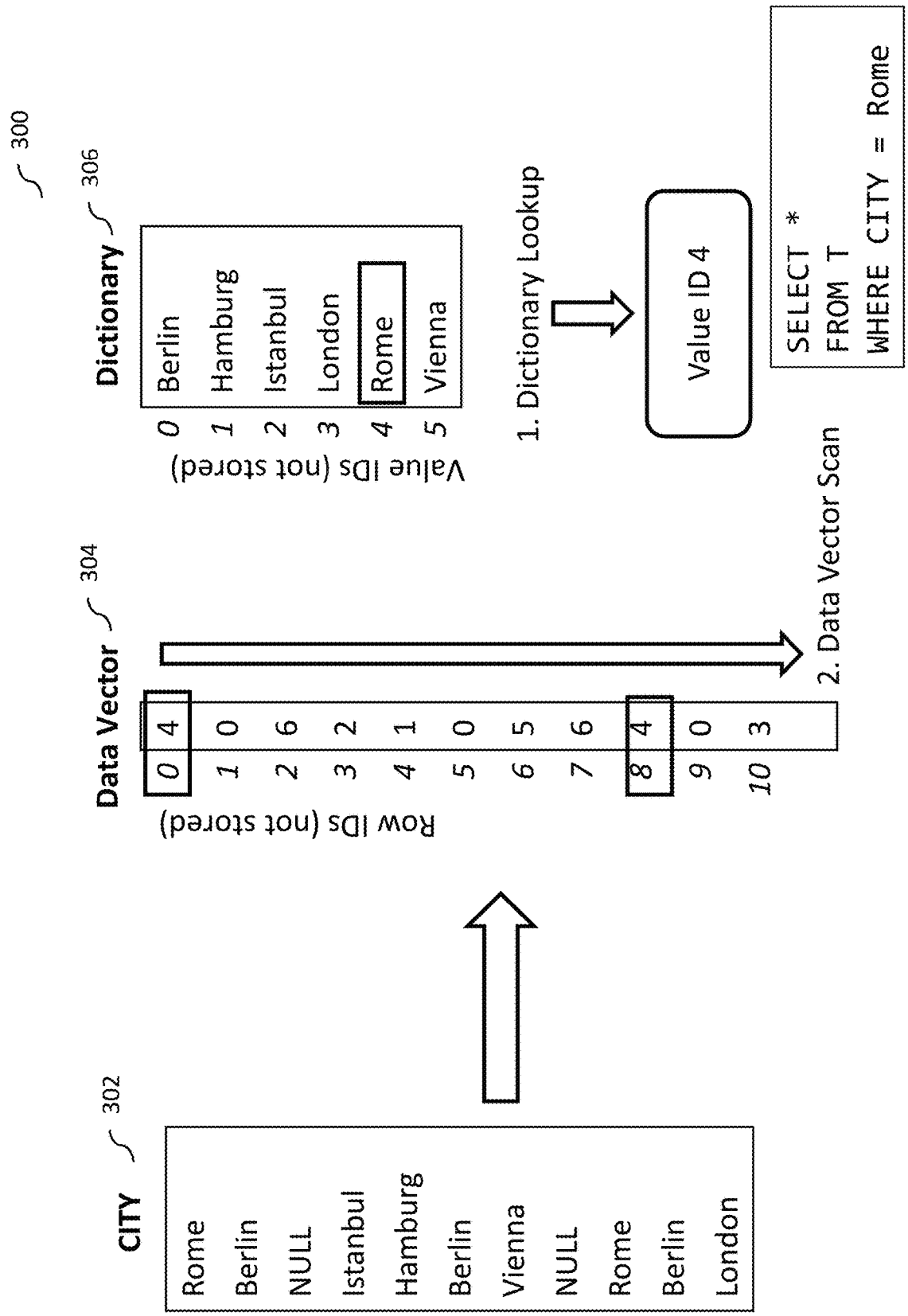
FIG. 3 illustrates an exemplary domain compression process.

In the main fragment, domain encoding (also known as dictionary compression) may be used on all columns for compression (and, thereby, speeding up some operations). FIG. 3 illustrates an exemplary domain encoding/compression process 300. Domain encoding 300 may decompose a logical column (e.g., "CITY" 302) into a sorted dictionary of distinct values (e.g., "Dictionary" 306) and a data vector (e.g., "Data Vector" 308) that references values in the dictionary.

For example, to find rows with a certain value, first a dictionary lookup ("1. DictionaryLookup") may be executed to determine the "value ID" of the value (e.g., using binary search), then the data vector may be scanned ("2. DataVector Scan") to find rows with that value ID.

In some implementations, the data structure placement may be implemented by extending a database system's (e.g., SAP HANA) buffer cache with an NVM-backed layer. With this extension, a placement hint may be specified that the requested page may be located in NVM instead of DRAM when a page is requested from the buffer cache. Whether the page is in DRAM or NVM is then completely transparent to the data structure and algorithms using that page. This results in great flexibility for accommodating individual data structures of columns in either DRAM or NVM. All NVM allocations may be performed in a single place in the buffer cache, rather than in each data structure which may need to be modified individually. The current subject matter may be configured for placement of data using granularity of data structures as well as placement of data with page granularity.

An NVM block provider may be configured to make allocations in NVM. The block provider may use a Direct Access (DAX)-enabled filesystem to expose blocks allocated on NVM DIMMs configured in App Direct mode as regular memory pointers. By not committing the allocated blocks, the NVM may be used as working memory and may properly be freed when the system is restarted. The buffer cache may be sized such that it is able to hold the entire working set without evictions.

Figure 4:
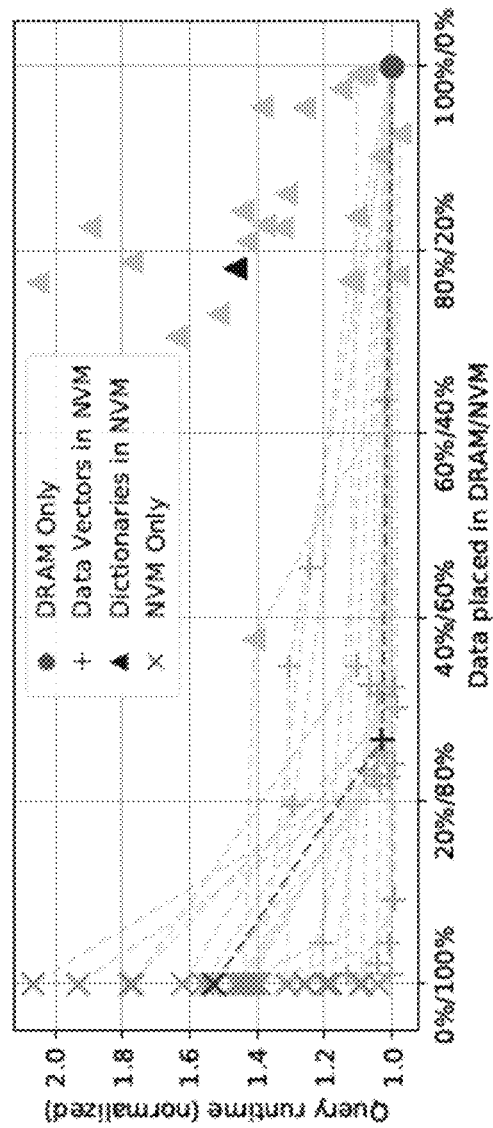
FIG. 4 illustrates an exemplary, experimental plot showing, for each of the four placement strategies, query runtimes relative to placing all data in DRAM, as well as the amount of data placed in NVM or DRAM as a fraction of the total amount of data accessed by the respective query.

In some implementations, as stated above, the system 100 may be configured to place data in a particular type of memory based on data structure type. To understand feasibility and potential of placing main memory (e.g., SAP HANA's main memory) in NVM, the system 100 was experimentally tested with four placement strategies using queries from the TPC-H benchmark with scale factor 100. The four initial strategies are: DRAM Only (•), i.e., all data is placed in DRAM, Data Vectors in NVM (+), Dictionaries in NVM (▲), and NVM Only (X) (results of which are shown in FIG. 4 and discussed below). Besides data vectors and dictionaries, the NVM Only strategy also places indices in NVM. In some exemplary implementations, the current subject matter may be configured to operate on page-loadable data.

FIG. 4 illustrates an exemplary, experimental plot 400 showing, for each of the four placement strategies, query runtimes relative to placing all data in DRAM, as well as the amount of data placed in NVM or DRAM as a fraction of the total amount of data accessed by the respective query. FIG. 4 shows this for each of TPC-H's 22 individual queries and for a combined run of all queries. Because only data that is accessed by queries is loaded into the buffer cache, columns that are not accessed by the queries (e.g., L_COMMENT) are not included in the memory usage statistics. All data that is placed in NVM may be accessed at least once by the queries. As shown in FIG. 4, placing all data in NVM (X) might not be an acceptable strategy—as a 53% slowdown was observed for the combined workload compared to DRAM-only placement (•), with worst-case slowdowns of up to 106% for individual queries. Placing only data vectors in NVM (+) may produce acceptable results: a significant fraction of the data may be placed in NVM yet query times increase only moderately for most queries. In contrast, placing dictionaries in NVM (▲) may generally result in drastic slowdowns and lower amounts of data stored in NVM. Even among these four basic placement strategies, placing dictionaries in NVM is almost never Pareto-optimal with respect to time and space usage, as shown by the dashed lines in FIG. 4. For data vectors, scans of large parts may be the norm, while dictionaries may primarily be subject to random point access. Scan-like access patterns may suffer less performance degradation when data is located in NVM than random access. However, for some queries, placing dictionaries in NVM may be a better choice. For example, for Q11, placing data vectors in NVM yields a 30% slowdown, while placing dictionaries in NVM slows the query down by only 3%.

Figure 5:
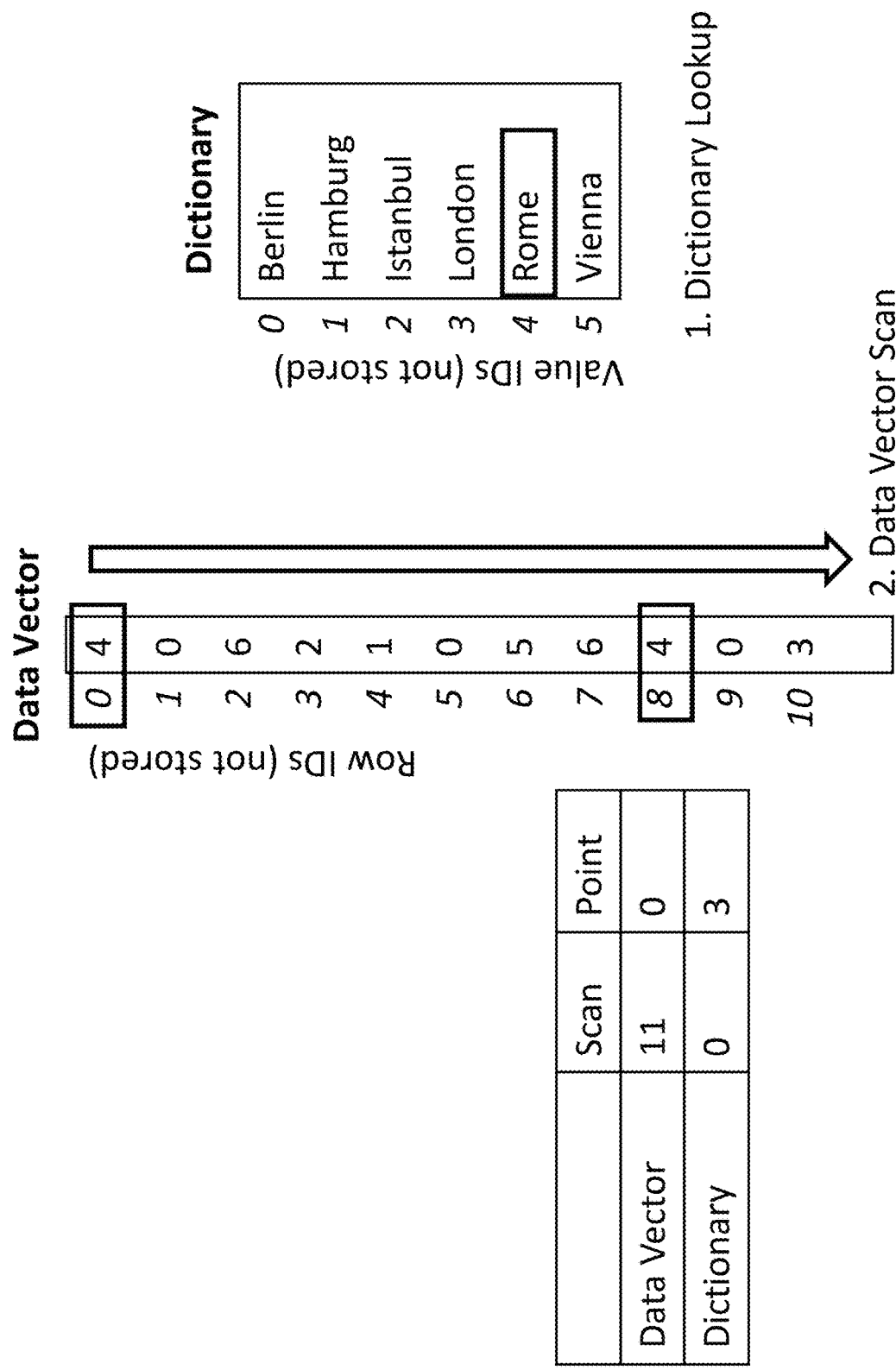
FIG. 5 illustrates an exemplary access counter, according to some implementations of the current subject matter.

In some implementations, to provide for a more refined placement strategy, the current subject matter may be configured to implement access counters (e.g., counters 107) on the two main data structures (e.g., data vectors and dictionaries). An exemplary access counter 500 is shown in FIG. 5. The counter 500 may represent a total number of accesses to entries of the data structures, and thus, they may closely approximate actual memory accesses performed by lookup and/or scan operations. Because data vectors and dictionaries may additionally be compressed, the counter 500 might not accurately reflect actual memory accesses in all cases. Estimations of and/or a sampling of a number of accesses may also be made. One or more access counters 500 may be implemented at the level of logical accesses since this may reduce implementation effort and runtime overhead over a lower-level implementation. To be able to place at column and data-structure granularity, one or more access counters may be separately collected for each column. In some implementations, the current subject matter may be configured to distinguish between point accesses (e.g., access to data in a specific memory location) and scans (searching a set of data) for the counters. For point accesses, dense point accesses may also be tracked. A point access may be considered dense if it reads the element prior or subsequent to the data structure's last accessed entry. This may be useful because dense point accesses may include a much more scan-like access pattern than true random point access, which may result in a less significant slowdown when data with this access pattern is placed in NVM. To provide a more automated physical database design, the current subject matter system 100 may be configured to count a total number of accesses to each data structure based on which placement decisions at data structure granularity may be made. In some exemplary implementations, one set of counters (e.g., three integers) may exist per data vector and/or per dictionary. Counters may also be updated lazily, e.g., if multiple accesses occur in succession, these may be first aggregated locally by the plan operator and added to the counter of the respective data structure only once. The performance and space overhead of maintaining counters is therefore negligible.

Figure 6:
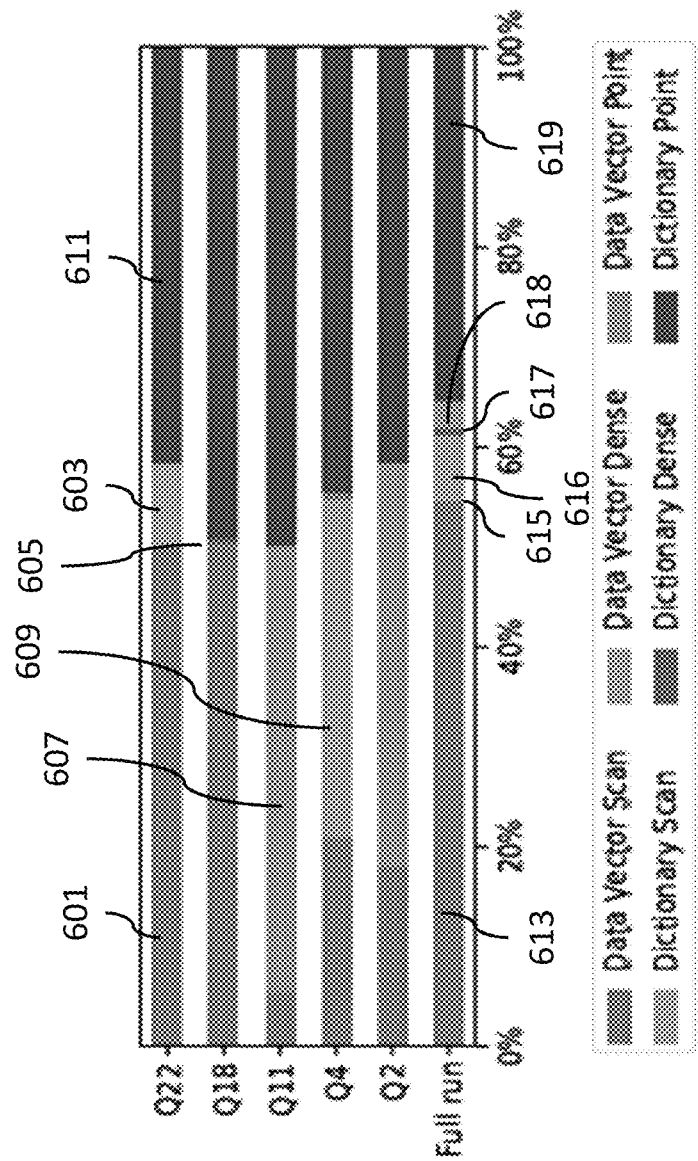
FIG. 6 shows an exemplary, experimental distribution of access types on all columns collected for a run of all TPC-H queries and selected interesting queries.

FIG. 6 shows an exemplary, experimental distribution 600 of access types on all columns collected for a run of all TPC-H queries and selected interesting queries. For the majority of the 22 queries, the distribution 600 (showing data vector scan percentages 601, dictionary scan percentages 603, data vector dense point access percentages 605, dictionary sense access percentages 607, data vector point access percentages 609, and dictionary point access percentages 611) illustrates that data vectors are predominantly scanned and/or accessed with dense point accesses whereas dictionaries are mostly accessed using point accesses, and among these point accesses, dense point accesses are the exception. Dictionaries are also almost never scanned. One counterexample, as shown by 603 in FIG. 6, is Q22 where the dictionary of the column C_PHONE is scanned to perform substring matching. FIG. 6 also shows access types for queries Q2 and Q11, which exhibit many data vector point accesses. For both queries, around 40% of the total accesses are data vector point accesses, which coincides with a slowdown compared to other queries when data vectors accessed in Q2 and Q11 were placed in NVM.

Further, it may be noted that the majority of point accesses on data vectors may be dense point accesses, e.g., exhibiting a scan-like access pattern. An extreme example of this is Q4, where 55% of all accesses are data vector point accesses but 61% of these accesses are dense. This is caused by fully materializing the L_RECEIPTDATE and L_COMMITDATE columns for the existence check in the query. As L_RECEIPTDATE and L_COMMITDATE are compared by this check and no pre-filtering takes place, both columns may be fully materialized, meaning that each row of their data vectors is accessed sequentially.

The full run of all queries is dominated by 54.7% scanned data vector entries 613 and 6.1% dense data vector accesses 616. Only 2.8% of all accesses are random point accesses 618 to the data vectors. 35.1% of all accesses are dictionary point accesses 619, and just 1.2% are dictionary scans 615 or dense dictionary point accesses 617. This matches the results in FIG. 4 that illustrates slowdowns mostly when placing dictionaries in NVM.

Figure 7:
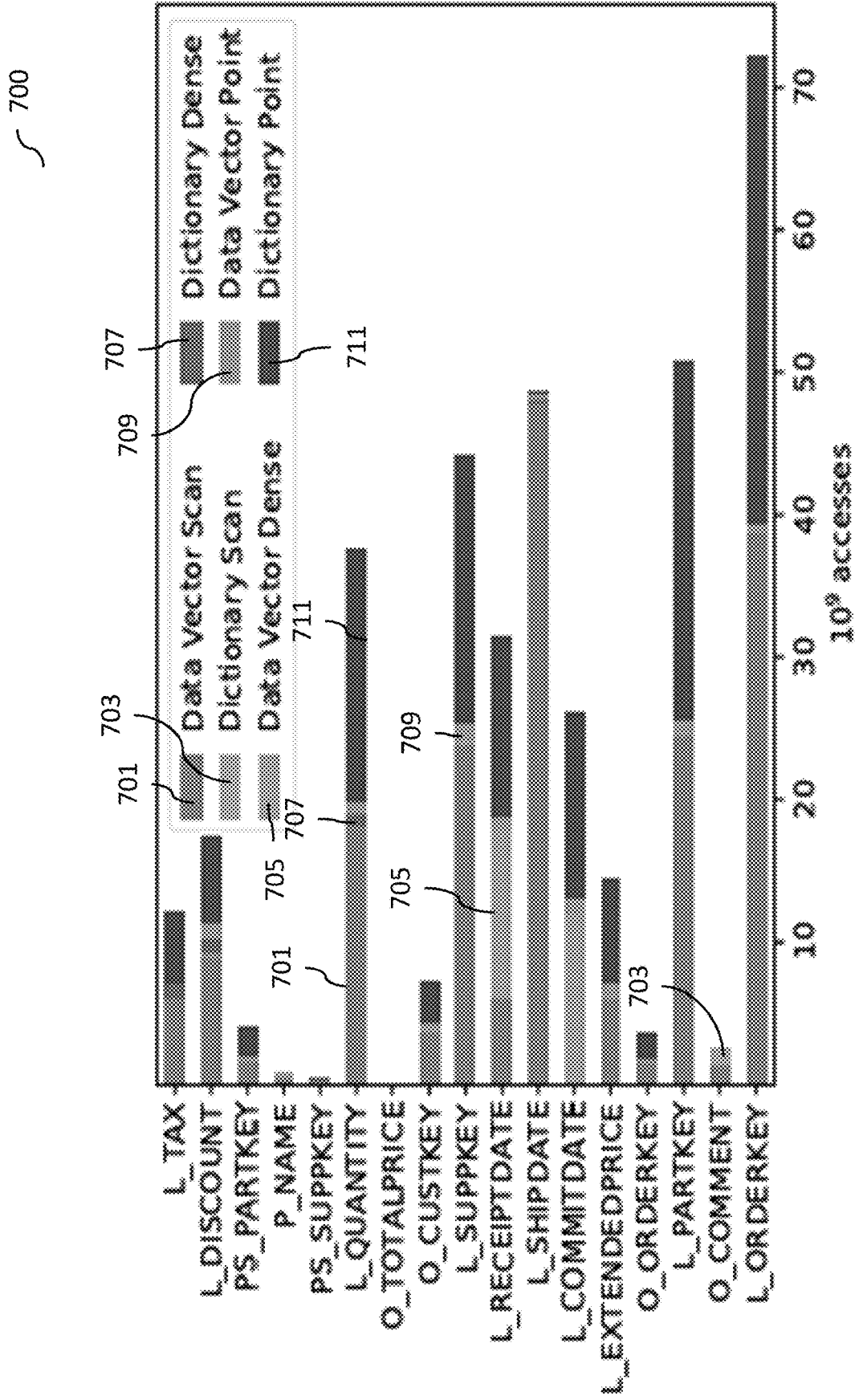
FIG. 7 illustrates an exemplary distribution plot showing access counters in a run of all TPC-H queries on the largest used columns.

In some implementations, the system 100 (as shown in FIG. 1) may be configured to determine a placement strategy based on the data obtained from the access counters 107. The system 100 may be configured to use a heuristic to determine placement (or memory location) of the data vector and dictionary of each column according to the accesses to them, with the goal of placing as much data as possible in NVM while preventing deterioration of performance as much as possible. For the heuristic, the following two factors may be considered. First, as discussed above, a majority (e.g., more than 70%) of all accesses in a full run of all TPC-H queries are scan-like, and this access pattern may exhibit similar performance on DRAM and NVM, while a random point access pattern may result in a performance loss when data is placed in NVM. Thus, one factor in the heuristic may include the scan-to-point-access-ratio of a data structure. Second, many of the columns with the highest memory consumption are rarely accessed, as shown by the plot 700 in FIG. 7, illustrating access counters in a run of all TPC-H queries on the largest used columns which constitute more than 90% of the memory usage of all columns. Similar to FIG. 6, FIG. 7 illustrates data vector scan percentages 701, dictionary scan percentages 703, data vector dense point access percentages 705, dictionary sense access percentages 707, data vector point access percentages 709, and dictionary point access percentages 711. In FIG. 7, examples of such infrequently accessed columns may include O_TOTALPRICE, PS_SUPPKEY, and P_NAME. As these columns have a large memory usage but are accessed infrequently, it is sensible to design the heuristic such that the data vectors and dictionaries of these columns are placed in NVM regardless of their scan-to-point-access ratio.

In view of the number of scanned entries $n_{scan}$, the number of dense point accesses $n_{dense}$, and the number of random point accesses $n_{point}$ for any data vector or dictionary, the system 100 may be configured to use the following heuristic to determine whether the data structure should be placed in NVM:

$$\text{Place in NVM} = (n_{scan} + n_{dence}) > 10 \cdot n_{point} 11\ (n_{scan} + n_{dence} + n_{point}) < 0.01 \cdot n_{total} \quad (1)$$

where $n_{total}$ is the total number of accesses on this type of data structure across all columns.

Figure 8:
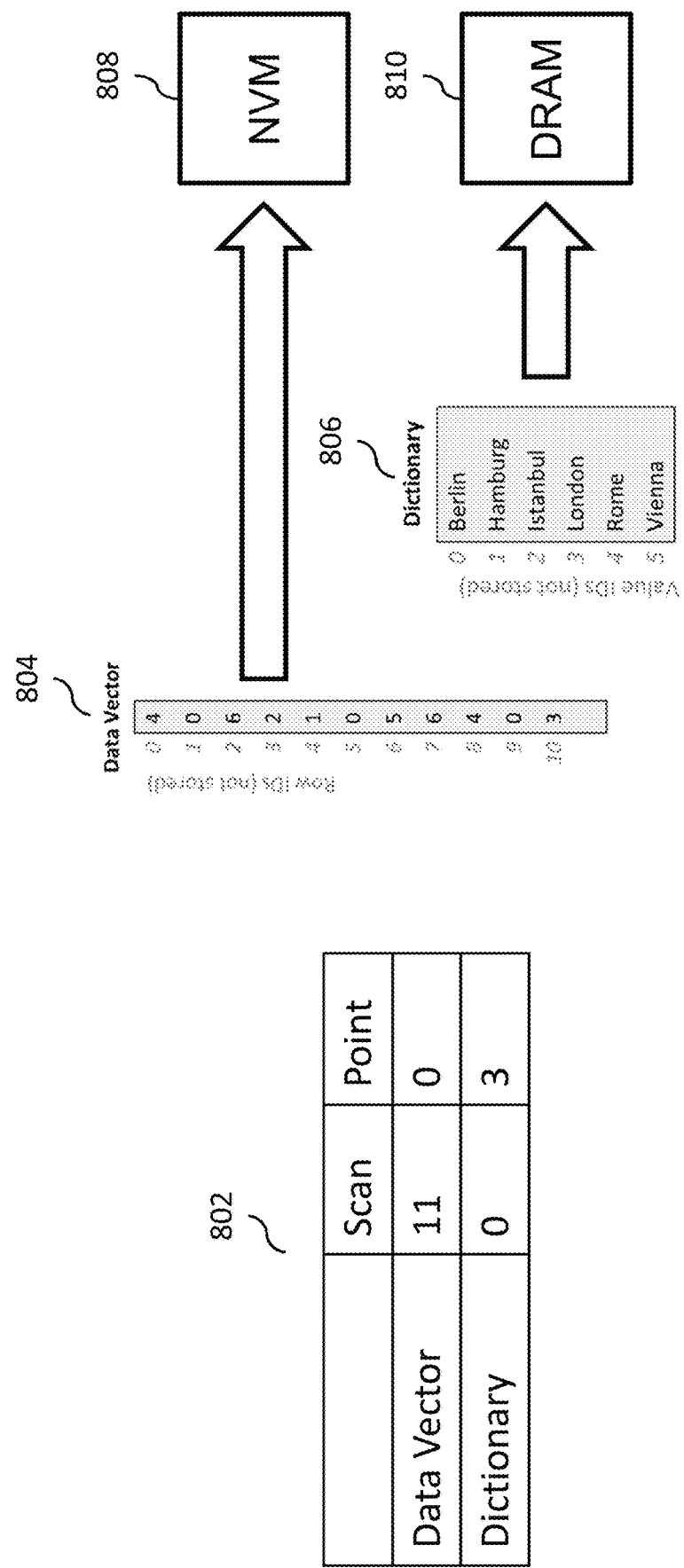
FIG. 8 illustrates an exemplary data structure placement process, according to some implementations of the current subject matter.

By way of a non-limiting example, if a structure is scanned ten times more than it is access by random point accesses, or if it is overall accessed by less than 1% of all accesses to this structure type across the entire workload, the data structure may be placed in NVM. The factors 10 and 1% may be derived experimentally. An exemplary placement 800 of data in various types of memory is shown in FIG. 8. As illustrated in FIG. 8, table 802 illustrates a number of scans and point accesses to data vectors 804 and dictionaries 806. A data vector(s) was/were accessed 11 times using a scan and no point accesses were recorded. Conversely, dictionary was only accessed using a point access (e.g., 3 times) and no scans were performed on the dictionary. In view the statistic shown in table 802, the data vector 804 was placed (or stored) in the NVM 808 and the dictionary 806 was placed in DRAM 810.

In some implementations, the current subject matter can be implemented in various in-memory database systems, such as a High-Performance Analytic Appliance ("HANA") system as developed by SAP SE, Walldorf, Germany. Various systems, such as, enterprise resource planning ("ERP") system, supply chain management ("SCM") system, supplier relationship management ("SRM") system, customer relationship management ("CRM") system, and/or others, can interact with the in-memory system for the purposes of accessing data, for example. Other systems and/or combinations of systems can be used for implementations of the current subject matter. The following is a discussion of an exemplary in-memory system.

Figure 9:
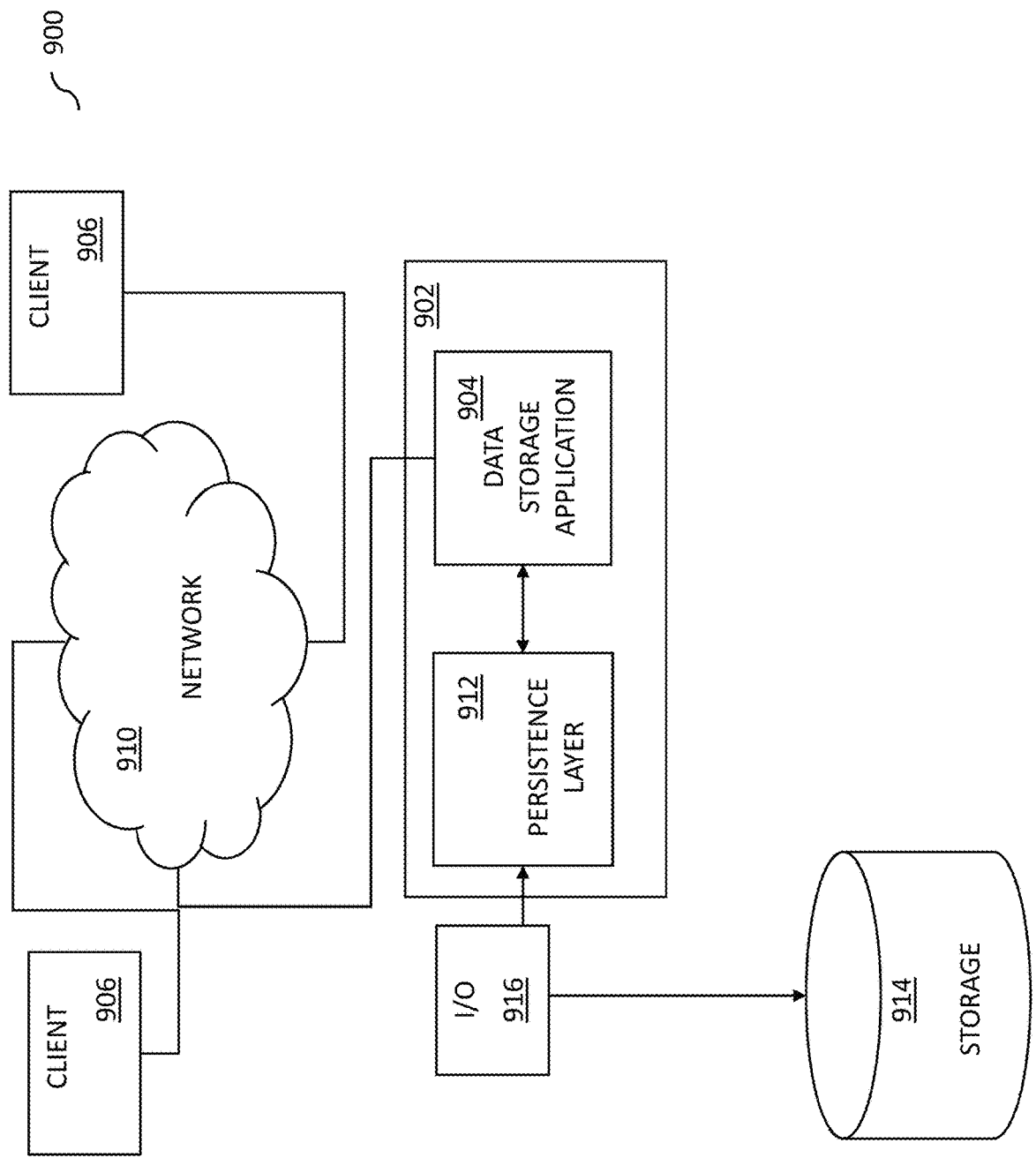
FIG. 9 is a diagram illustrating an exemplary system including a data storage application, according to some implementations of the current subject matter.

FIG. 9 illustrates an exemplary system 900 in which a computing system 902, which can include one or more programmable processors that can be collocated, linked over one or more networks, etc., executes one or more modules, software components, or the like of a data storage application 904, according to some implementations of the current subject matter. The data storage application 904 can include one or more of a database, an enterprise resource program, a distributed storage system (e.g. NetApp Filer available from NetApp of Sunnyvale, CA), or the like.

The one or more modules, software components, or the like can be accessible to local users of the computing system 902 as well as to remote users accessing the computing system 902 from one or more client machines 906 over a network connection 910. One or more user interface screens produced by the one or more first modules can be displayed to a user, either via a local display or via a display associated with one of the client machines 906. Data units of the data storage application 904 can be transiently stored in a persistence layer 912 (e.g., a page buffer or other type of temporary persistency layer), which can write the data, in the form of storage pages, to one or more storages 914, for example via an input/output component 916. The one or more storages 914 can include one or more physical storage media or devices (e.g. hard disk drives, persistent flash memory, random access memory, optical media, magnetic media, and the like) configured for writing data for longer term storage. It should be noted that the storage 914 and the input/output component 916 can be included in the computing system 902 despite their being shown as external to the computing system 902 in FIG. 9.

Data retained at the longer term storage 914 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 10:
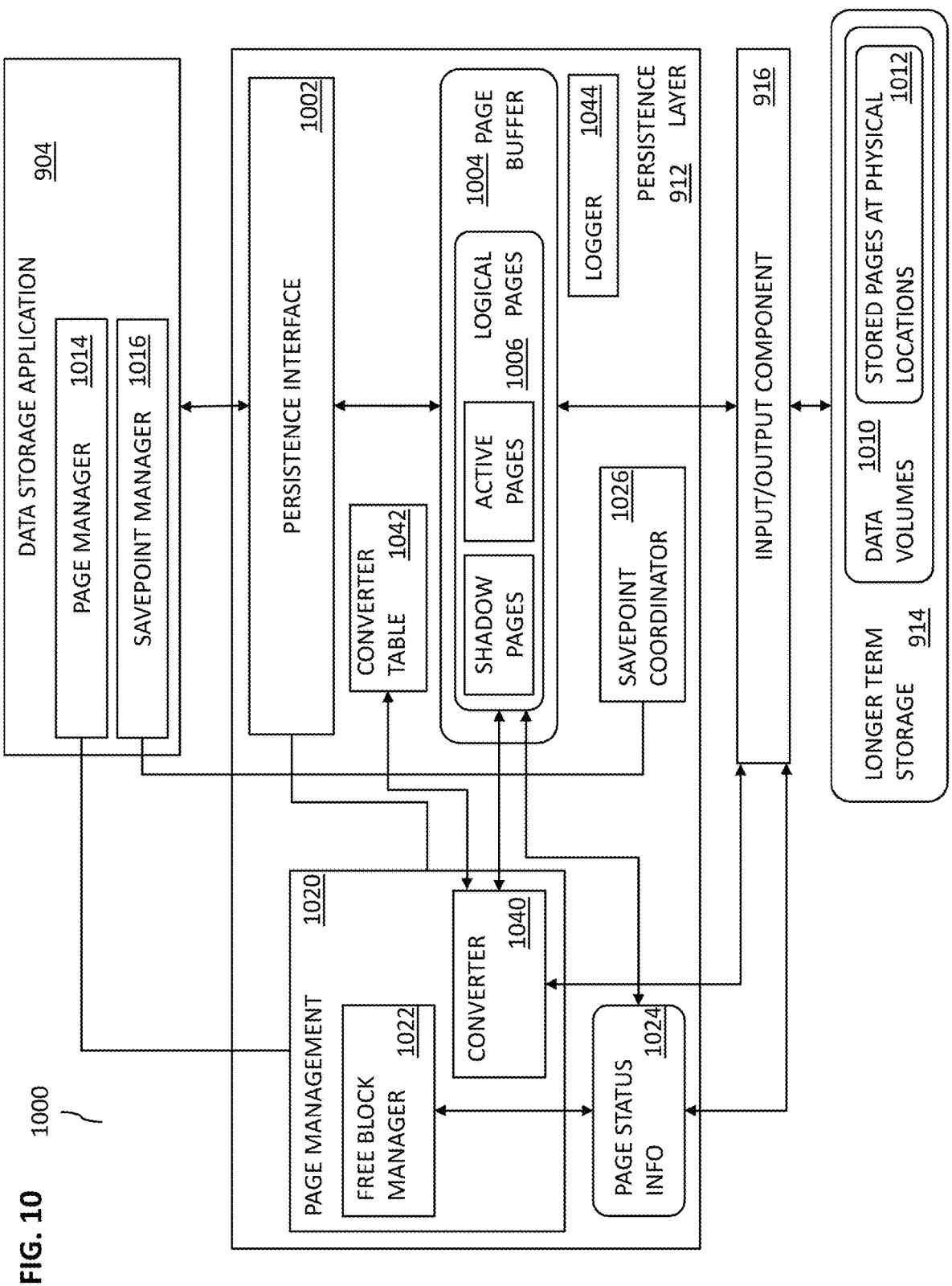
FIG. 10 is a diagram illustrating details of the system of FIG. 9.

FIG. 10 illustrates exemplary software architecture 1000, according to some implementations of the current subject matter. A data storage application 904, which can be implemented in one or more of hardware and software, can include one or more of a database application, a network-attached storage system, or the like. According to at least some implementations of the current subject matter, such a data storage application 904 can include or otherwise interface with a persistence layer 912 or other type of memory buffer, for example via a persistence interface 1002. A page buffer 1004 within the persistence layer 912 can store one or more logical pages 1006, and optionally can include shadow pages, active pages, and the like. The logical pages 1006 retained in the persistence layer 912 can be written to a storage (e.g. a longer term storage, etc.) 914 via an input/output component 916, which can be a software module, a sub-system implemented in one or more of software and hardware, or the like. The storage 914 can include one or more data volumes 1010 where stored pages 1012 are allocated at physical memory blocks.

In some implementations, the data storage application 904 can include or be otherwise in communication with a page manager 1014 and/or a savepoint manager 1016. The page manager 1014 can communicate with a page management module 1020 at the persistence layer 912 that can include a free block manager 1022 that monitors page status information 1024, for example the status of physical pages within the storage 914 and logical pages in the persistence layer 912 (and optionally in the page buffer 1004). The savepoint manager 1016 can communicate with a savepoint coordinator 1026 at the persistence layer 912 to handle savepoints, which are used to create a consistent persistent state of the database for restart after a possible crash.

In some implementations of a data storage application 904, the page management module of the persistence layer 912 can implement a shadow paging. The free block manager 1022 within the page management module 1020 can maintain the status of physical pages. The page buffer 1004 can include a fixed page status buffer that operates as discussed herein. A converter component 1040, which can be part of or in communication with the page management module 1020, can be responsible for mapping between logical and physical pages written to the storage 914. The converter 1040 can maintain the current mapping of logical pages to the corresponding physical pages in a converter table 1042. The converter 1040 can maintain a current mapping of logical pages 1006 to the corresponding physical pages in one or more converter tables 1042. When a logical page 1006 is read from storage 914, the storage page to be loaded can be looked up from the one or more converter tables 1042 using the converter 1040. When a logical page is written to storage 914 the first time after a savepoint, a new free physical page is assigned to the logical page. The free block manager 1022 marks the new physical page as "used" and the new mapping is stored in the one or more converter tables 1042.

The persistence layer 912 can ensure that changes made in the data storage application 904 are durable and that the data storage application 904 can be restored to a most recent committed state after a restart. Writing data to the storage 914 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 1044 can also be included to store the changes made to the data of the data storage application in a linear log. The logger component 1044 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 1044 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 912 can use a combination of undo log entries (from one or more logs) and shadow paging.

The persistence interface 1002 can handle read and write requests of stores (e.g., in-memory stores, etc.). The persistence interface 1002 can also provide write methods for writing data both with logging and without logging. If the logged write operations are used, the persistence interface 1002 invokes the logger 1044. In addition, the logger 1044 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 1044. For an entry of type "update", for example, this would be the identification of the affected record and the after image of the modified data.

When the data application 904 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 1044 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 1044 can write a database log (or simply referred to herein as a "log") sequentially into a memory buffer in natural order (e.g., sequential order, etc.). If several physical hard disks/storage devices are used to store log data, several log partitions can be defined. Thereafter, the logger 1044 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 904 can use shadow paging so that the savepoint manager 1016 can write a transactionally-consistent savepoint. With such an arrangement, a data backup comprises a copy of all data pages contained in a particular savepoint, which was done as the first step of the data backup process. The current subject matter can be also applied to other types of data page storage.

Figure 11:
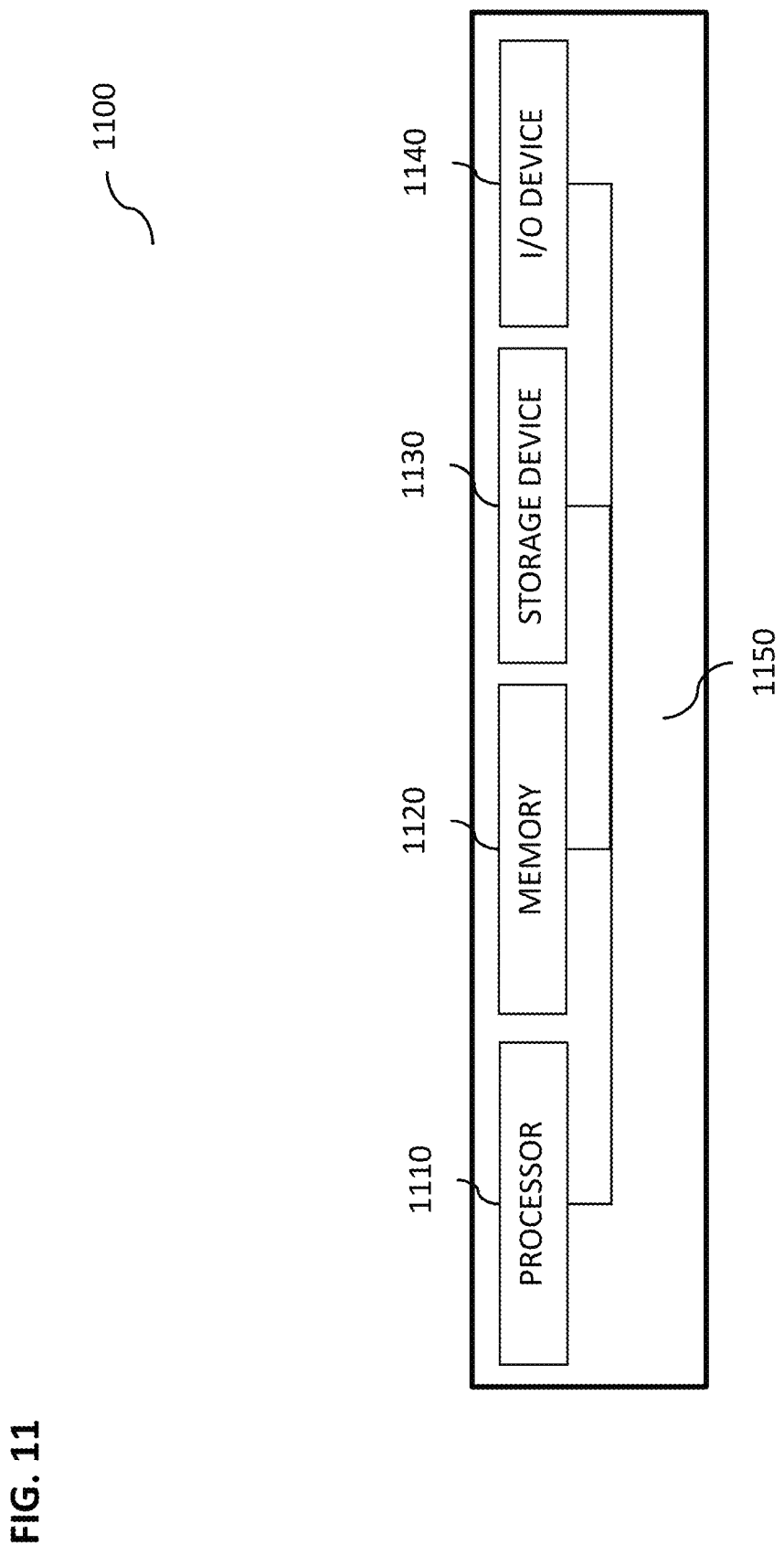
FIG. 11 illustrates an exemplary system, according to some implementations of the current subject matter.

In some implementations, the current subject matter can be configured to be implemented in a system 1100, as shown in FIG. 11. The system 1100 can include a processor 1110, a memory 1120, a storage device 1130, and an input/output device 1140. Each of the components 1110, 1120, 1130 and 1140 can be interconnected using a system bus 1150. The processor 1110 can be configured to process instructions for execution within the system 1100. In some implementations, the processor 1110 can be a single-threaded processor. In alternate implementations, the processor 1110 can be a multi-threaded processor. The processor 1110 can be further configured to process instructions stored in the memory 1120 or on the storage device 1130, including receiving or sending information through the input/output device 1140. The memory 1120 can store information within the system 1100. In some implementations, the memory 1120 can be a computer-readable medium. In alternate implementations, the memory 1120 can be a volatile memory unit. In yet some implementations, the memory 1120 can be a non-volatile memory unit. The storage device 1130 can be capable of providing mass storage for the system 1100. In some implementations, the storage device 1130 can be a computer-readable medium. In alternate implementations, the storage device 1130 can be a floppy disk device, a hard disk device, an optical disk device, a tape device, non-volatile solid state memory, or any other type of storage device. The input/output device 1140 can be configured to provide input/output operations for the system 1100. In some implementations, the input/output device 1140 can include a keyboard and/or pointing device. In alternate implementations, the input/output device 1140 can include a display unit for displaying graphical user interfaces.

Figure 12:
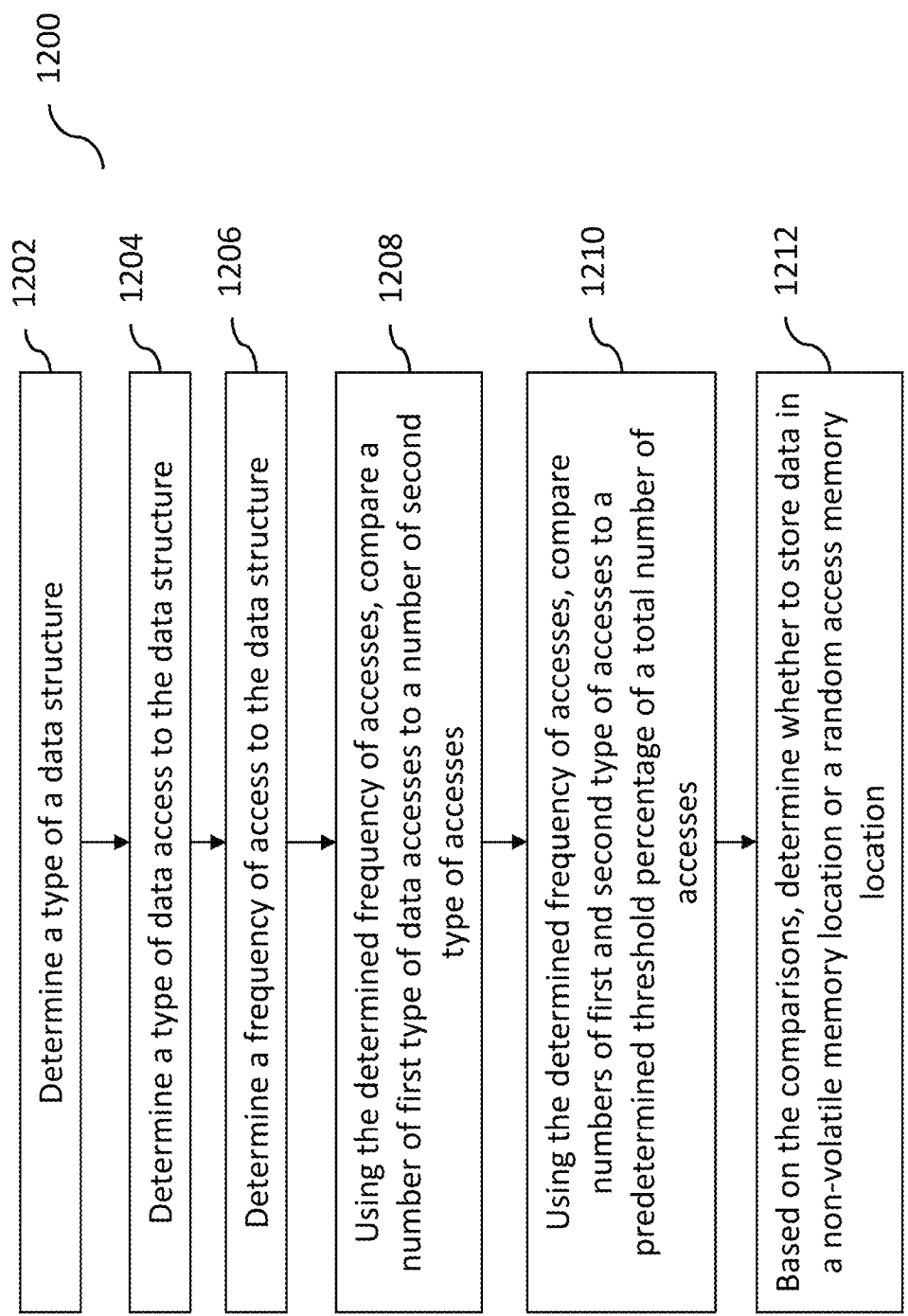
FIG. 12 illustrates an exemplary method, according to some implementations of the current subject matter.

FIG. 12 illustrates an exemplary method 1200 for placement or storage of data structures in memory/storage locations (e.g., NVM, DRAM, etc.), according to some implementations of the current subject matter. The method 1200 may be executed by the system 100 (shown in FIG. 1), and in particular the processing engine 105, as shown in FIG. 1. The method 1200 may implement the techniques discussed above in connection with FIGS. 2-8.

At 1202, the engine 105 may be configured to determine a type of a data structure for which placement strategy may need to be determined. For example, the data structure may include a data vector, a dictionary, and/or any other type of data structure. At 1204, a type of data access to the data structure may be determined. The type of data access may include a point access, a data scan, a dense point access, and/or any other access type and/or any combinations thereof.

At 1206, using one or more counters 107 (shown in FIG. 7), the system 100 may be configured to determine a frequency of accesses for the data structure (e.g., a frequency of each type of data access to each type of data structure). The counters may be used to determine and/or estimate a total number of access to the data structure, a number of point accesses, a number of data scans, a number of dense point accesses, and/or any other frequency of accesses.

At 1208, the system 100 may be configured to determine a placement strategy for the data structure. It may be configured to compare a number of first type of accesses (e.g., scan accesses and/or dense point accesses (which may behave like the scan accesses)) and a number of second type of accesses (e.g., point accesses), where, for comparison purposes, the number of second type of accesses may be multiplied by a predetermined first threshold factor (e.g., 10 as discussed above).

At 1210, the system 100 may also compare the total number of the first and second type of accesses to a predetermined threshold percentage (e.g., 1% as discussed above) of a total number of all accesses. Based on the comparisons, the system 100 may be configured to determine whether to place the data structure in a specific type of memory location (e.g., non-volatile memory or random access memory).

In some implementations, the current subject matter may include one or more of the following optional features. The data structure may include at least one of the following: a data vector, a dictionary, and any combination thereof. The type of data access may include at least one of the following: a point access, a data scan, a dense point access, and any combinations thereof.

In some implementations, the frequencies of accesses for the data structure may be determined using one or more counters. One or more counters may be configured to determine at least one of the following: a total number of access to the data structure, a number of point accesses to the data structure, a number of data scans of the data structure, a number of dense point accesses to the data structure, and any combination thereof.

In some implementations, the first type of access may include at least one of the following: a scan access of the data structure, a dense point access of the data structure, and any combination thereof. The second type of access to the data structure may include a point access to the data structure.

In some implementations, the physical memory location may include at least one of the following: a non-volatile memory, a random access memory, and any combination thereof.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer implemented method, comprising:
   determining, by a data placement and storage management system, automatically, according to a set schedule, a type of a data structure for storing data and a type of data access to the data structure, the type of data access comprises at least a first type of data access and a second type of data access, the data placement and storage management system comprising a placement policy engine, a computing platform comprising one or more processors, one or more counters, and one or more memory components;
   determining, by the data placement and storage management system, a frequency of each type of access to each type of data structure accessed by a query;
   comparing, by the data placement and storage management system, using the frequency,
      a number of first type of data accesses to the data structure to a number of second type of accesses to the data structure; and
      the number of first type of data access and the number of the second type of data access to a predetermined threshold percentage of a total number of data accesses to the data structure;
   determining, by the data placement and storage management system, based on the comparing, a physical memory location for storing the data; and
   storing, by the data placement and storage management system, the data at the physical memory location.

2. The computer implemented method of claim 1, wherein the data structure-comprises at least one of: a data vector, a dictionary, and any combination thereof.

3. The computer implemented method of claim 1, wherein the type of data access comprises at least one of: a point access, a data scan, a dense point access, and any combinations thereof.

4. The computer implemented method of claim 1, wherein the frequency of each type of accesses for the data structure is determined using one or more counters.

5. The computer implemented method of claim 4, wherein the one or more counters are configured to determine at least one of: a total number of access to the data structure, a number of point accesses to the data structure, a number of data scans of the data structure, a number of dense point accesses to the data structure, and any combination thereof.

6. The computer implemented method of claim 1, wherein
   the first type of access comprises at least one of: a scan access of the data structure, a dense point access of the data structure, and any combination thereof;
   the second type of access to the data structure comprises a point access to the data structure.

7. The computer implemented method of claim 1, wherein the physical memory location comprises at least one of: a non-volatile memory, a random access memory, and any combination thereof.

8. A system comprising:
   at least one programmable processor; and
   a non-transitory machine-readable medium storing instructions that, when executed by the at least one programmable processor, cause the at least one programmable processor to perform operations comprising:
      determining, by a data placement and storage management system, automatically, according to a set schedule, a type of a data structure for storing data and a type of data access to the data structure, the type of data access comprises at least a first type of data access and a second type of data access, the data placement and storage management system comprising a placement policy engine, a computing platform comprising one or more processors, one or more counters, and one or more memory components;
      determining, by the data placement and storage management system, a frequency of each type of access to each type of data structure accessed by a query;
      comparing, by the data placement and storage management system, using the frequency,
         a number of first type of data accesses to the data structure to a number of second type of accesses to the data structure; and
         the number of first type of data access and the number of the second type of data access to a predetermined threshold percentage of a total number of data accesses to the data structure;
      determining, by the data placement and storage management system, based on the comparing, a physical memory location for storing the data; and
      storing, by the data placement and storage management system, the data at the physical memory location.

9. The system of claim 8, wherein the data structure comprises at least one of: a data vector, a dictionary, and any combination thereof.

10. The system of claim 8, wherein the type of data access comprises at least one of: a point access, a data scan, a dense point access, and any combinations thereof.

11. The system of claim 8, wherein the frequency of each type of accesses for the data structure is determined using one or more counters.

12. The system of claim 11, wherein the one or more counters are configured to determine at least one of: a total number of access to the data structure, a number of point accesses to the data structure, a number of data scans of the data structure, a number of dense point accesses to the data structure, and any combination thereof.

13. The system of claim 8, wherein
the first type of access comprises at least one of: a scan access of the data structure, a dense point access of the data structure, and any combination thereof;
the second type of access to the data structure comprises a point access to the data structure.

14. The system of claim 8, wherein the physical memory location comprises at least one of: a non-volatile memory, a random access memory, and any combination thereof.

15. A computer program product comprising a non-transitory machine-readable medium storing instructions that, when executed by at least one programmable processor, cause the at least one programmable processor to perform operations comprising:
determining, by a data placement and storage management system, automatically, according to a set schedule, a type of a data structure for storing data and a type of data access to the data structure, the type of data access comprises at least a first type of data access and a second type of data access, the data placement and storage management system comprising a placement policy engine, a computing platform comprising one or more processors, one or more counters, and one or more memory components;
determining, by the data placement and storage management system, a frequency of each type of access to each type of data structure accessed by a query;
comparing, by the data placement and storage management system, using the frequency,
a number of first type of data accesses to the data structure to a number of second type of accesses to the data structure; and
the number of first type of data access and the number of the second type of data access to a predetermined threshold percentage of a total number of data accesses to the data structure;
determining, by the data placement and storage management system, based on the comparing, a physical memory location for storing the data; and
storing, by the data placement and storage management system, the data at the physical memory location.

16. The computer program product of claim 15, wherein the data structure comprises at least one of: a data vector, a dictionary, and any combination thereof.

17. The computer program product of claim 15, wherein the type of data access comprises at least one of: a point access, a data scan, a dense point access, and any combinations thereof.

18. The computer program product of claim 15, wherein the frequency of each type of accesses for the data structure is determined using one or more counters;
wherein the one or more counters are configured to determine at least one of: a total number of access to the data structure, a number of point accesses to the data structure, a number of data scans of the data structure, a number of dense point accesses to the data structure, and any combination thereof.

19. The computer program product of claim 15, wherein the first type of access comprises at least one of: a scan access of the data structure, a dense point access of the data structure, and any combination thereof;
the second type of access to the data structure comprises a point access to the data structure.

20. The computer program product of claim 15, wherein the physical memory location comprises at least one of: a non-volatile memory, a random access memory, and any combination thereof.

* * * * *